United States Patent [19]

Tan

[11] 4,292,581
[45] Sep. 29, 1981

[54] LINEAR SWITCHING REGULATOR

[76] Inventor: Tat S. Tan, P.O. Box 24, Mt. Marion, N.Y. 12456

[21] Appl. No.: 57,353

[22] Filed: Jul. 13, 1979

[51] Int. Cl.³ .............................................. H02P 13/32
[52] U.S. Cl. ..................................... 323/283; 323/290
[58] Field of Search ............ 323/17, DIG. 1; 363/47, 363/48, 124; 333/181

[56] References Cited

U.S. PATENT DOCUMENTS

| 3,931,566 | 1/1976 | Pask et al. | 323/17 |
| 4,021,720 | 5/1977 | Linnman | 363/124 |
| 4,128,771 | 12/1978 | Domenico | 323/17 |

FOREIGN PATENT DOCUMENTS

| 52-2119 | 1/1977 | Japan | 323/DIG. 1 |
| 390515 | 10/1973 | U.S.S.R. | 323/DIG. 1 |
| 441632 | 12/1974 | U.S.S.R. | 323/DIG. 1 |

OTHER PUBLICATIONS

IBM Technical Disclosure Bulletin, vol. 18, No. 11, pp. 3737-3738, Apr. 1976.

Primary Examiner—William H. Beha, Jr.
Attorney, Agent, or Firm—Friedman, Goodman & Teitelbaum

[57] ABSTRACT

A switching voltage regulator for regulating line voltage which produces an output proximating that of a linear voltage regulator. The switching voltage regulator includes a linear amplifier which receives a reference signal as well as an output feedback signal and produces an overall feedback signal for utilization. A discrete processor receives the overall feedback signal as well as a feedback from its own switching output signal in order to produce its output switching signal as a pulse strength modulation signal. The pulse strength modulation signal is then used to switch on and off the line voltage in order to produce an intermediate output signal which is then filtered in order to produce the voltage regulated output signal. A feedback processor can be included between the voltage regulated output signal and the linear amplifier and can provide either regular voltage feedback or can also include damping factor feedback.

28 Claims, 15 Drawing Figures

LINEAR SWITCHING REGULATOR

BACKGROUND OF THE INVENTION

This invention relates to voltage regulators and more particularly to a switching voltage regulator which proximates the output of a linear voltage regulator.

A voltage regulator is a device which produces at its output high quality electric power, as for example, a constant voltage source, from a low quality electric power input, specifically the supply or the line. The input may vary in a wide range which is unacceptable to some delicate instruments and equipments. To maintain a constant voltage at the output, the regulator has a network between the input and the output, referred to as the voltage compensation network, and the voltage drop across this network is controlled by the error voltage which is obtained by comparing the output with a reference. The network operates in such a manner that the output stays significantly constant even though the input may vary over a wide range.

The voltage compensation network can be resistive, whereby it is composed of resistors and transistors working in the linear mode. A regulator of this design is conventionally called a linear regulator. A linear regulator has good performance in many respects except its low efficiency in power utilization, because the resistive voltage compensation network dissipates significant amount of power. The power loss in this network is eventually converted into heat, which is a major cause of component failure in many machines, and requires a considerable amount of space and money to remove the heat from the machines. The advance of electronic technology and equipments demands more compact and efficient regulated power supplies and therefore new methods have been investigated for making the regulator more efficient and more compact. Efforts have been made to use a reactive voltage compensation network for the regulator. Such network is a nondissipating network and thus the efficiency of the regulator improves significantly because there is no power loss in the voltage compensation network. A reactive voltage compensation network can be used if the input power is chopped or switched on and off into a sequence of pulses. A regulator of this design is called a switching regulator.

The major problem in designing a switching regulator is to control the sequence of pulses, specifically when to switch the power on and off so that the output is kept constant. The obvious and simplest method to control the sequence is to switch the power on when the output drops below a specified voltage and to switch it off when the output rises above the other specified voltage. This approach was frequently used in early design and also used in integrated circuit TL497 produced by Texas Instruments. In this way, the output will, hopefully, stay in the narrow designed range of the two specified voltages disregarding any other conditions. Although in theory this approach is acceptable, in practice a regulator of this design is inferior in performance.

Recently the pulse width modulation method has been used as a means to control the pulses. The pulse modulation can be carried out using known integrated circuits, such as Motorola's MC3420 which is commercially available for this purpose. In a broad sense all switching regulators are of pulse width modulation. The problem, however, is how to determine the width of the pulses in the presence of various parameters, namely the output, the input, and the load. No matter how the switching regulator is designed, the basic problem is how the width should be affected by these parameters. For example, it can be in the form of a simple function or a complex one, an instant response, or a delayed one, or other variations. Determination of the appropriate control of the pulse width modulation is a significant problem of prior art devices.

In addition to switching control, obtaining appropriate feedback is also a problem with prior art devices. Suppose the output changes suddenly due to the change of some parameters. The regulator has to immediately determine the width of the new pulses to be issued. The pulses of this new width, after certain delay due to the voltage compensation network including a low pass filter, arrive at the output to correct the previous change. If the correction is found too large for the change, then it produces at the output a new change of opposite polarity. Consequently, a new correction of opposite polarity is called for and the regulator is thus ringing or oscillating.

Obviously, a switching regulator of optimal performance should have a proper feedback system and produce pulses of a width just about right for the correction of the change at the output and should determine the pulse width in less than a switching cycle time and with advanced knowledge of what exactly the pulses of that width to be issued will do at the output when they arrive sometime later. This feature cannot be accomplished alone by the present low frequency feedback; it needs a high frequency feedback of some sort.

The output of the switching regulator is actually the average of the pulses over a period of time determined by time constant and the delay factor of the low pass filter. This average, together with the reference, is used to control the generation of pulses in such a manner that the average stays constant despite the variation of other parameters. However, the average is not the only statistical quantity produced by the pulses over that period of time; there are other quantities, for example, the variance. Those other quantities represent some of the undesirable occurrences at the output. If a switching regulator has no special controls over those other quantities, the output may ring or even oscillate at frequencies higher than the frequency determined by the parameters of the low pass filter without changing the average. Therefore a switching regulator of optimal performance should have provisions to control or attenuate these to minimum. Since the low frequency feedback is already used for the control of the average, the control of the other quantities must belong to a high frequency feedback.

Accordingly, the pulse width modulation of the present regulators which produces pulses of a width proportional to the error voltage without considering the other parameters and without advanced knowledge of what the issued pulses will do to the output sometime later, cannot produce the best results.

SUMMARY OF THE INVENTION

It is accordingly an object of the present invention to provide a voltage regulator which avoids the aforementioned problems of prior art devices.

It is a further object of the present invention to provide a switching voltage regulator which proximates the output of a linear voltage regulator.

Yet a further object of the present invention is to provide a switching voltage regulator which provides pulse modulation based upon the strength of the pulses produced.

An additional object of the present invention is to provide a voltage switching regulator which includes a feedback system operating at a high frequency.

Another object of the present invention is to provide a switching voltage regulator having a feedback which includes both voltage feedback and damping factor feedback.

Still a further object of the present invention is to provide a switching voltage regulator providing switching signals depending upon the strength of the pulse and wherein a fixed clock turns on the switching signal in each cycle and the control circuit determines the off time in each cycle, based upon the strength of the pulse.

Still a further object of the present invention is to provide a switching voltage regulator having a switching signal wherein the on time in each cycle is determined by the strength of the pulse produced and the off time is determined by a fixed clock.

Yet another object of the present invention is to provide a switching voltage regulator which provides a switching signal for turning on and off the line voltage and wherein the on and off times are varied and determined by a free running oscillator.

Another object of the present invention is to provide a switching voltage regulator including a feedback processor which operates by means of a sample and hold circuit for sampling periodically the output voltage.

Yet another object of the present invention is to provide a switching voltage regulator having a low pass filter for filtering the output.

A further object of the present invention is to provide a switching voltage regulator having a low pass filter with an auxiliary inductance pass for reducing the response time by speeding up large transition.

The foregoing objects are achieved in accordance with the present invention which provides for a voltage regulator for regulating line voltage. The voltage regulator includes a linear amplifier which receives a reference signal and a feedback signal from the output of the voltage regulator. The linear amplifier produces an overall feedback signal. A discrete processor utilizes the overall feedback signal, in conjunction with a feedback from its own output switching signal in order to produce its output switching signal as a pulse strength modulation signal. The pulse strength modulation signal is utilized by an output circuit to control the turning on and off of the line voltage to produce an intermediate output signal. This intermediate output signal is filtered in order to produce the voltage regulated output signal.

In an embodiment of the invention the discrete processor includes integration means formed by means of a current source controlled by the switching signal and is utilized for turning off of the line voltage in each cycle. The turning on being provided by a fixed clock generator. In an alternate embodiment, the clock is used for turning off the line voltage in each cycle and the current source is utilized for providing the on signal. In yet another embodiment, a free running oscillator is utilized to produce the switching signal, whereby both the on and off time is controlled by means of the discrete processor itself and varies in each cycle.

The feedback processor can include only voltage feedback and can also include damping factor feedback.

The damping factor feedback is achieved by taking the derivative of the output signal. In taking the output signal it can be done either by directly receiving the output signal or by means of a sample and hold circuit for selectively sampling the output values at discrete timer intervals. The feedback processor receives the on and off timing signals from the discrete processor in order to operate in synchronism therewith.

In an embodiment of the invention, the low pass filtering includes an auxiliary inductance pass which operates to improve the response time when the system is driven into saturation. The auxiliary path can be either by means of an inductor coupled as a transformer or connected electrically in parallel with the main inductor.

The foregoing objects, features and advantages of the invention will, in part, be pointed out with particularity, and will, in part, become obvious from the following more detailed description of the invention, taken in conjunction with the accompanying drawings which form an integral part thereof.

BRIEF DESCRIPTION OF THE DRAWINGS

In the drawings.

In the various figures of the drawing, like reference characters designate like parts.

DESCRIPTION OF THE PREFERRED EMBODIMENT

Theory of the Invention

The objects of the present invention are accomplished in general by providing a switching regulator controlled by a unique modulation method referred to as pulse strength modulation and having a unique feedback method called damping factor feedback. A brief derivation and analysis of these methods will first be presented.

The operation of a switching regulator is completely determined by a discrete set of points in time at which the power is switched on or off. In other words, it operates in a discrete mode, like a digital signal processor. With certain limitation, digital methods of signal processing can carry out any signal process as good as any other device operating in the continuous mode, conventionally called an analogue device. Therefore there is no reason that a switching regulator which operates in a discrete mode, cannot be designed to operate as good as a linear regulator which is an analogue device operating in the continuous mode. Accordingly, in order to achieve the proper type of pulse modulation and the proper high frequency feedback, it is necessary to determine how the switching regulator can be made to operate as good as a linear regulator.

Figure 1:
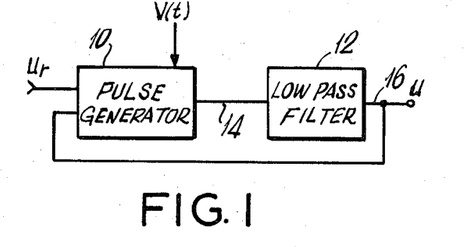
FIG. 1 is a generalized block diagram of a switching voltage regulator.
Figure 2:
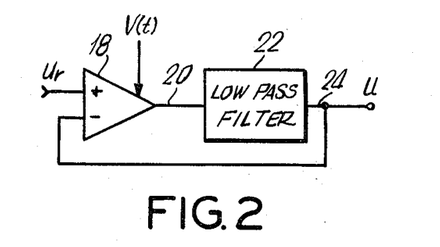
FIG. 2 is a generalized block diagram of a linear voltage regulator.

A switching regulator, no matter how it is designed, can basically be divided into two functional blocks, as shown in FIG. 1, and includes a controllable pulse generator 10 and low pass filter 12. The controllable pulse generator 10 is basically a switching amplifier operating in the discrete mode which produces a pulse train $f(u_r-u)$ on line 14, where u is the output of the switching regulator on line 16, $u_r$ is a reference voltage, and $$f(u_r - u) = \begin{cases} v(t), & \text{if the power is switched on,} \\ 0, & \text{if the power is switched off,} \end{cases}$$

where v(t) is the line voltage. The pulse train goes via line 14 to the low pass filter 12 to produce the output u on line 16, which is fedback to control pulse generator 10. The above arrangement is equivalent to the linear arrangement operating in the continuous mode shown in FIG. 2, in which amplifier 18 operating in the continuous mode produces a signal $k(u_r-u_a)$ and replaces pulse generator 10, while the rest remains the same. The output on line 24 is designated $u_a$. A switching regulator of proper design as in FIG. 1 should perform exactly or approximately like the linear regulator shown in FIG. 2. For simplicity, we call switching regulators of this type linear switching regulators rather than ripple control switching regulators.

The system equal for a switching regulator shown in FIG. 1 is $$L(d/dt)u = f(u_r - u). \tag{1}$$

where $L(d/dt)$ is the differential operator for low pass filter 12. Since a linear switching regulator is an implementation of voltage regulation in the discrete mode, there must be a way that equation (1) can be linearized to $$L(d/dt)u_a = k(u_r = u_a), \tag{2}$$

which is the system equation of the circuit shown in FIG. 2. We take the convolution of equation (1) by a function F to obtain:

$$F \cdot f(u_r - u) = F \cdot f(u_r = u),$$

where the dot in the above expression represents convolution operations for the sake of simplicity. Noting that we take the derivative operation out of the convolution, we get $$L(d/dt)F \cdot u = F \cdot f(u_r - u).$$

In comparing the equation (2), we have $$F \cdot u = u_a \approx u, \tag{3a}$$

$$F \cdot f(u_r - u) = k(u_r - u_a) \tag{3b}$$

Equation (3b) states the relation of the output of the switching amplifier $f(u_r-u)$, and its input $u_r$ and $u_a$, and thus it defines a feedback which is what has been referred to as the high frequency feedback. More precisely it states that after processing $f(u_r-u)$ according to F, the outcome of $f(u_r-u)$ is proportional to the inputs of the switching amplifer. Since in real time operation one pulse is to issue per cycle, the process should be completed in one cycle time and that is why it is called a high frequency feedback.

We can get an approximate solution for F, remembering that a discrete process is valid for time limited or bandlimited signals and that F must be related to the characteristic function of timelimited or bandlimited signals.

For timelimited signals $$f = \begin{cases} 1/T & |t| \leq T/2 \\ 0 & \text{otherwise} \end{cases}$$

Substituting this into equations (3b) and (3a), we obtain $$1/T \int_{t-T/2}^{t+T/2} f(u_r - u)dt' = 1/T \int_{-T/2}^{+T/2} f(u_r - u(t-t'))dt' = k(u_r - u_a) \tag{4a}$$

$$1/T \int_{t-T/2}^{t+T/2} u(t')dt' = 1/T \int_{-T/2}^{+T/2} u(t-t')dt' = u_a \approx u. \tag{4b}$$

In order to satisfy that $u_a$ equals u less the unwanted components, mainly the ripple, we have to take $T = n/f$, where f is the operating frequency of the switching regulator and n, an interger. In this way $u_a$ equals the average of u over n full switching cycles and thus the ripple cancels itself out completely in the average. For fast response we want T as short as possible and definitely choose $n=1$ or $T=1/f$. In this way equation (4b) is automatically satisfied.

Equation (4a) represents the conversion of the continuous representation to the discrete representation or vice versa, depending on which way equation (4a) is read. First let us examine what equation (4a) actually means. Fixing the sampling phase for simplicity by changing t to t-T/2 and noting that $f(u_r - u)$ equals the line voltage v(t) during the power-on period, say from t to t+a, and zero during the power-off period, from t+a to t+T, we get from equation (4a)

$$k(u_r - u_a) = 1/T \int_t^{t+a} v(t')dt' = 1/T \int_0^a v(t')dt'. \quad (4a')$$

The right handside of the equation is the pulse strength of the pulse issued in the cycle from t to t+T, while the left handside is proportional to the input to the linear amplifier equivalent of the switching amplifier. In other words the linear switching regulator should be controlled by pulse strength modulation, i.e. the pulse strength, not the pulse width, is made proportional to the input signal. Besides linearizing the system, pulse strength modulation has an additional advantage that the system is line independent or of self line regulation, a valuable feature a regulator can have.

Figure 3:
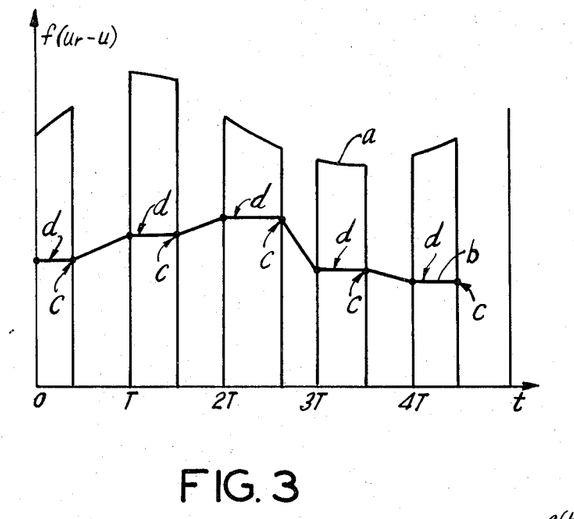
FIG. 3 is a graph for use in explaining the concept of pulse strength modulation.

For a given $u_a$, there may not exist a $f(u_r-u)$ to satisfy equation (4a) exactly. In other words we can only satisfy equation (4a) approximately. That is not surprising, for most signal processors are carried out approximately anyway. The curve of $f(u_r-u)$ and the curve of its integral in the left handside of equation (4a), namely the smoothened out curve of $f(u_r-u)$ and independent of the line, are drawn in FIG. 3 to show what the approximation is. In the power on period of each cycle the smoothened out curve of $f(u_r-u)$ curve b, has horizontal line segments, and in the power off period, it has straight lines joining two adjacent horizontal segments. Curve B is very closely matched to the curve of a step function used successfully in D to A conversion for digital signal processing. Equation (4a) states that $f(u_r-u)$ is so determined that the curve $k(u_r-u_a)$ intersects its smoothened out curve at least one point in each cycle regularly; as to where the intersection occurs is not specified due to the freedom of sampling phases. There are two particular sampling phases of interest: one is where the intersection occurs at the end of the power on period, point c, at which the pulse strength of the current pulse is known and at which the control unit, the discrete processor, can make the decision to switch the power off with this arrangement. A clock switches the power on the discrete processor switches it off. The other sampling phase is where the intersection occurs at the beginning of the power on period, d. With this arrangement the discrete processor switches the power on and the clock switches it off. This last arrangement is particularly useful for SCR control power regulation.

For a switching regulator, it is just as important to balance the inductor current with the load as it is to regulate the output voltage to the reference. In general the regulation of the output by voltage feedback is not a good way to balance the two currents, because the inductor current and the output are not in phase, particularly for a high Q low pass filter. This is demonstrated by the serious ringing of the regulator which occurs in actual use. To lower the Q factor of the low pass filter is not a good approach because it lowers the efficiency of the system, but it is the only approach used up to now. However, a new feedback source has been found. To balance the two currents, we need a term $-R(I_{ind} - I_{load})$ in the feedback loop, where $I_{ind}$ and $I_{load}$ are the inductor current less the ripple current, and the load current, respectively. Using a Hall effect current probe, one can measure the current difference easily. Additionally, since the difference of the two currents has nowhere to go but to charge or discharge the output capacitor, therefore $I_{ind} - I_{load}$ is proportional to $(d/dt)u_a$. Accordingly, we can include a term $-k'/k(d/dt)u_a = -R(I_{ind.} - I_{load})$ in the feedback to insure the speedy balance of the two currents. In this way equations (4a) and (2) become:

$$k(u_r - u_a) - k' \frac{d}{dt} u_a = 1/T \int_{t-T/2}^{t+T/2} f(u_r - u)dt', \quad 5(a)$$

$$L\left(\frac{d}{dt}\right) u_a = k(u_r - u_a) - k' \frac{d}{dt} u_a. \quad 5(b)$$

The added term is recognized as a damping factor and therefore this approach will be referred to as the damping factor feedback. What this added term does is that it slows down the variation of the output by taking advanced action: if the output is going down, $(d/dt)u_a < 0$, the system increases appropriately the pulse strength to prevent the anticipated descent in advance, and if the output is going up, $(d/dt)u_a > 0$, the system decreases appropriately the pulse strength to prevent the anticipated ascent in advance. In this way the ringing is damped out effectively without affecting the efficiency of the system.

GENERAL DESCRIPTION OF THE INVENTION

Figure 4:
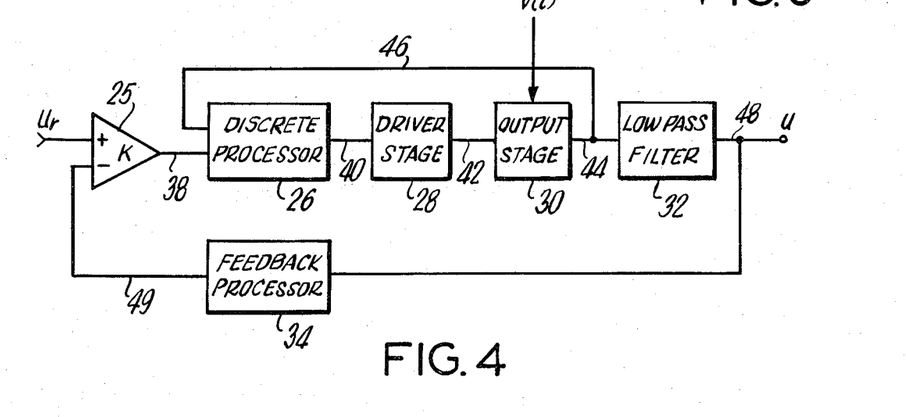
FIG. 4 is a block diagram of the switching voltage regulator in accordance with the present invention.

From the above results we are able to arrive at the configuration of a linear switching regulator as shown in FIG. 4. The linear switching regulator in general is divided into six functional blocks:

(a) the linear amplifier 25 which provides the needed voltage gain for the system. The gain from a linear amplifier is preferred because this gain is less noisy than the gain from a switching amplifier, which suffers from jittering.

(b) discrete processor 26 which is actually the input stage of the switching amplifier; it senses the output of the linear amplifier 25 and the output from output stage 30 to control the driver stage 28 accordingly to the conditions of the inputs to the processor 26.

(c) the driver stage 28 which provides AC or DC driving power to switch on and off the power transistors in the output stage 30 according to the control from the discrete processor 26.

(d) output stage 30 which is comprised of power transistors, which are controlled by the discrete processor via the driver stage to switch the power v(t) on and off to supply just enough power to a load via the low pass filter 32 or to an output transformer system for step up or step down application.

(e) feedback processor 34 which senses the output of the switching regulator and processes it to produce the desirable feedback signal to the linear amplifier 25 to produce proper control signals.

(f) low pass filter 32 which is used to smoothen out the pulse output from the output stage to thereby produce a DC source.

The discrete processor 26 computes $f(u_r - u)$ according to equation 4a or 5a using data from the output of the linear amplifier 25 via line 38. Specifically, it uses $k(u_r - u_a)$ for voltage feedback only as in equation 4a or $k(u_r-u_a)-k'(d/dt)u_a$ for voltage and damping factor feedback as in equation 5a thus it determines when to switch the power v(t) on and off.

The output of the discrete processor 26 goes via line 40 to the driver stage 28 which then produces isolated driving power on line 42 for output stage 30. The latter uses the driving power to switch the power v(t) on and off to produce the output $f(u_r-u)$ directly or through a transformer and a full wave bridge rectifier for step up or step down application. This output goes back through line 46 to the discrete processor 26. This output also goes by way of line 44 to low pass filter 32, which produces the regulated output u on line 48, the output of the regulator. Output u then goes to the feedback processor 34, which computes $u_a$ from u when using equation 4a, produces $u_a+k'(d/dt)u_a$ when equation (5a) is used. The output of the feedback processor goes via line 49 to the linear amplifier 25 which also receives $u_r$ and produces $k(u_r-u_a)$ or $k(u_r-u_a)-k'(d/dt)u_a$ for use by the discrete processor 26.

The detailed configuration of the discrete processor depend on the particular set up of the switching regulator. A switching regulator can be free running or of fixed frequency. The free running regulator is easier to implement and will be discussed later. The fixed frequency can be of on-time control, i.e. the discrete processor switches the power on while the clock switches it off, or of off-time control, i.e. the discrete processor switches the power off while the clock switches it on. The nature of the pulse strength modulation favors the latter because the pulse strength is completely determined at the control point, namely the time at which the power is switched off. The discussion will therefore be based on the off-time control and it will then be extended to the on time control. Let $$f_2(t) = 1/T \int_{\tau-T}^{\tau-T+t} f(u_r - u)dt'.$$

where $\tau-T$ and $\tau$ are the times at the start and the end of the current cycle (actually $\tau=nT$), and t be the real time in the current cycle, then the moment to switch the power off is when $$k(u_r - u_a) = f_2(t), \text{ or} \quad (6a)$$
$$k(u_r - u_a) - k'\frac{d}{dt}u_a = f_2(t)$$

where the first equation is for voltage feedback only and the second one for voltage and damping factor feedback. Now the problem is how to determine $u_a$ and $(d/dt)u_a$ from u. We consider $u_a$ first and $(d/dt)u_a$ later. The simple and effective approach is to use u for $u_a$. This is a good approach if we change the reference $u_r$ to $u_r-\delta(T)$ where $\delta(T)$ is the ripple voltage at the control point T. As a result the moment to determine $f(u_r-u)$ is then $$k(u_r-u)=f_2(t), \quad (6b)$$

Figure 5:
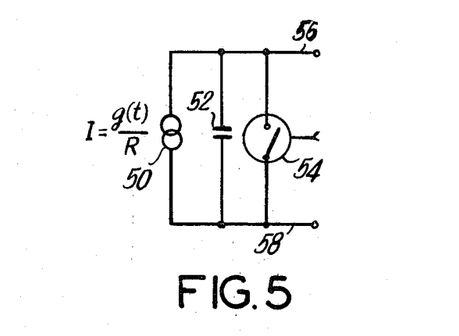
FIG. 5 is a schematic diagram showing a current source for use in an integration circuit which forms part of the discrete processor of the present invention.

Function $f_2(t)$ can be obtained by using an integrator with a capability to reset to zero. As shown in FIG. 5, the integration of a signal can be implemented by a current source 50 producing a current I proportional to the signal g(t) which charges capacitor 52. Resetting the integrator is achieved by discharge capacitor 52 to zero by activating switch 54. The output between line 56 and line 58 represents the integration output of the output signal. If the signal does not change sign, say g(t)>0, switch 54 can be a transistor and the current source proportional to the signal can be produced by current mirror circuits, which are widely used in integrated circuits in various forms.

Figure 6:
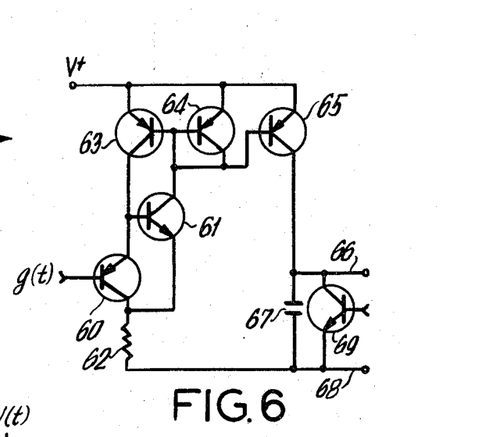
FIG. 6 is an embodiment showing a detailed circuit for the current source and the integrator shown in FIG. 5.

The design shown in FIG. 6 is an integrator using such current mirror circuits. Transistor pair 60 and 61 having identical characteristics form a current mirror circuit, and according to current mirror theory, a current flowing through transistor 60 induces a current of the same magnitude to flow through transistor 61 and the current flowing through transistor 60 equals g(t)/R, where 1/2R is the resistance of resistor 62. The currents flowing through transistors 60 and 61 also flow through transistors 63 and 64, which with transistor 65 are transistor triplets of identical characteristics and form another mirror circuit. Therefore, the current flow through transistor 65 is also g(t)/R. This current charges capacitor 67 to produce the integration of signal g(t) on line 66. Transistor 69 is used to discharge capacitor 67 when it is driven into conduction. If precision is not required, a current source approximately proportional to the signal can be produced by much simpler circuits. For simplicity the symbol shown in FIG. 5 will be used in subsequent circuits to represent an integrator. It is understood that the integrator can be made as in FIG. 6 or other embodiments.

Now let us turn our discussion to the set up where the clock switches the power off and the control switches it on. The major application of this is in using SCR's as the power switching elements in power regulation. The difficulty in this set up is that at the time the power is switched on the pulse width is known because the time to switch the power off is fixed by the clock and is known. However, the pulse strength is unknown because it needs all the data during the on-period. For pulse width modulation there is no problem since the pulse width is the only parameter needed and is already known at the time, but for pulse strength modulation the pulse strength is the paramount parameter, which is not yet known at the time the power is switched on and without which it is impossible to make the right control.

As a result we have to estimate the pulse strength at the time of issuing the pulse. To make sure that the estimated pulse strength is good, we assume that the average of the line voltage over one cycle, which will be called the full strength $V_f$, varies slowly from cycle to cycle. This assumption allows us to calculate the pulse strength of the issuing pulse as the difference between the full strength of the previous cycle and the pulse strength of the virtual pulse existing in the current off-period. The pulse strength of the virtual pulse is calculated as the time progresses in the form of $f'_2(t)$, similar to $f_2(t)$, $$f'_2(t) = 1/T \int_{\tau-T}^{\tau-T+1} (v(t') - f(u_r - u))dt'$$

where v(t) is the line voltage, and $v(t)\ni f(u_r-u)$ represents the virtual pulse in the off period. The computation of $f'_2(t)$ is the same as the one for $f_2(t)$. As a result the moment to switch the power on is when $$k(u_r-u_a)=V_f-f'_2(t). \quad (6c)$$

DESCRIPTION OF THE DISCRETE PROCESSOR

Figure 7:
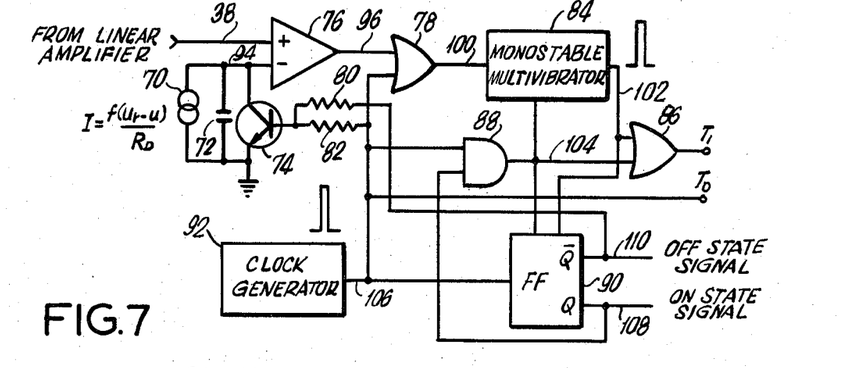
FIG. 7 is one embodiment of the discrete processor, wherein the clock is used for turning on the signal in each cycle and the current source is utilized for turning off the voltage in each cycle.

The design shown in FIG. 7 is a discrete processor for off-time control. Current source 79 producing a current of $I=f(u_r-u)/R_D$, capacitor 72 having a capacitance $C_D$, and transistor 74 with resistors 80 and 82 all form the integrator to compute $f_2(t)$. The output of the integrator on line 94, namely $f_2(t)$, goes to the negative input of voltage comparator 76, which compares it with the other input on line 38, which comes from the linear amplifier, as the overall feedback signal $k(u_r-u_a)$ or $k(u_r-u_a)-k'(d/dt)u_a$. On the crossing of the equality of its inputs, comparator 76 traansits at its output from high to low to signal the end of the current cycle and the start of a new one. The said transition on line 96 is able to pass through OR-GATE 78 onto line 100 to trigger monostable multivibrator 84, because the other input of OR-G-ATE 78 tied to line 106 is normally low. Upon being triggered, monostable multivibrator 84 generates a narrow positive going pulse on line 102 to reset flip flop 90, whose output Q and $\overline{Q}$, active high signals, provide on state and off state signals to the driver stage to control switching the power on and off. The off state signal on line 110 also goes through resistor 80 and drives transistor 74 into conduction to discharge capacitor 72 to get the integrator ready for the new cycle. The pulse on line 103 is also able to pass through OR-GATE 86 as end of cycle signal $T_1$ t the feedback processor, because the other input of OR-GATE 86 tied to line 104 is low. In due time the clock generator 92, produces a narrow positive going pulse on line 106 to set flip flop 90 on its trailing end the aforedescribed events repeat themselves. The clock pulse on line 106 also goes to feedback processor as signal $T_0$ for control purpose.

In the case of saturation, i.e. equation (4a) or (5a) cannot be satisfied since voltage comparator 76 will not make any transition to set off the aforedescribed events. To satisfy the timelimited requirement, the design uses clock pulse $T_0$ on line 106 as the end of cycle signal, $T_1$, to make up the missing events. There are two kinds of saturation: the high side saturation, i.e. the power stays on for the whole cycle indicated by the high state of the one state signal on line 108 when the clock pulse is issued, and the low side saturation, i.e. the power stays off for the whole cycle indicated by the low state on line 96 at the time clock pulse is issued. In the former case, clock pulse on line 106 goes through resistor 82 to discharge capacitor 72 by driving transistor 74 into conduction and also goes through AND-GATE 88 onto line 104 due to the high state of line 108 in this case and then passes through OR-GATE 86 as end of cycle signal $T_1$ to the feedback processor because of the low state of line 102. In the latter case, clock pulse on line 106 is able to pass through OR-GATE 78 onto line 100 to trigger monostable multivibrator 84, because line 96 is low in this case. Upon being triggered, monostable multivibrator generates a narrow positive going pulse on line 102 to set off the following events: it resets flip flop 90 to override the setting action of the clock pulse on line 106, due to the reset of flip flop 90, the off-state signal on line 110 becomes active, i.e. high state, and thus it discharged capacitor 72 by driving transistor 74 into conduction, and finally the pulse on line 102 passes through OR-GATE as end of cycle signal $T_1$ to the feedback processor.

There is a racing problem in the border area of the high side saturation i.e. the clock pulse on line 106 becomes active, or high, when the monostable multivibrator 84 has already been triggered and the process is in progress. The problem here is to insure the clock pulse to set flip flop 90 on its trailing edge. One way to do this is to lengthen the clock pulse sufficiencly so that it outlasts the pulse on line 102 and thus it is able to set flip flop 90 on its trailing edge. The other is to use the signal on line 104 to reset monostable multivibrator 84 to terminate the pulse on line 102 and to set flip flop 90 directly to override the reset by the pulse on line 102, as shown in FIG. 7. If the signal on line 104 fails to do this, then the clock pulse on line 106 is about one set-up time later than the pulse on line 102 and thus, for identical pulse width of the two pulses, it will outlast the pulse on line 102 by about one set-up time and is able to set flip flop 90 after the reset by pulse on line 102. To insure this to happen, we need only to lengthen the clock pulse a little. Of course there are many other techniques using extra circuits to solve the problem. There is no racing problem at the low side saturation, because the trigger of monostable multivibrator 84 is on the trailing edge of the clock pulse, i.e. after the completion of the clock pulse's mission.

$R_D$ and $C_D$ determine the voltage gain of the switching amplifier. However, the important thing here is to use the gain of the linear amplifier to the utmost, namely its maximum positive output swing $V^+$. This leads to the following formula to determine $C_D R_D$:

$$C_D R_D = \max(f(u_r-u))T/V^+.$$

For DC to DC down regulation or amplification application, $f(u_r-u)$ in the on-period approximately equals the line voltage, and if a transformer is used in the output stage for step up or step down application, it is approximately proportional to the line voltage. As a result, one can use the line voltage $v(t)$ for $f(u_r-u)$ and the off state signal on line 110 to keep capacitor 72 discharged to simulate the switching condition of $f(u_r-u)$. In this set up, $\max(f(u_r-u))$ equals the peak of the line voltage, and the requlation of this regulator suffers a little due to the approximation.

$C_D$ is selected large enough to overcome possible noise interference, but small enough to have very short discharge time. Once the capacitance $C_D$ is determined, $R_D$ is easily computed by the above formula.

Figure 8:
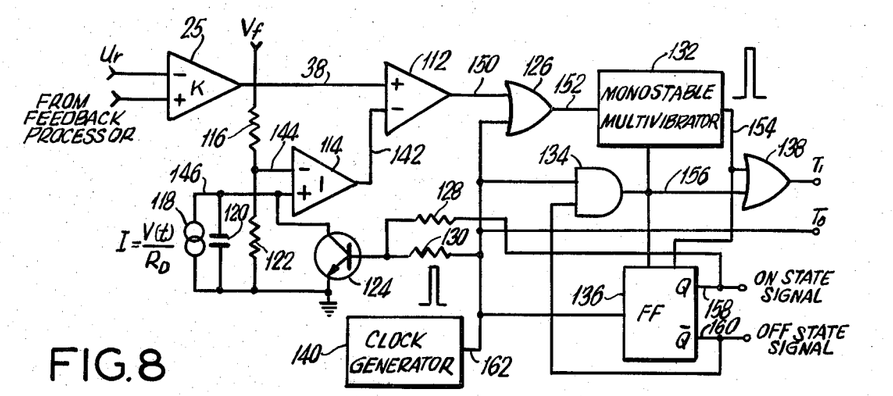
FIG. 8 is another embodiment of the present invention wherein the clock is used for turning off the signal in each cycle and the current source is utilized for turning on the voltage in each cycle.

The design shown in FIG. 8 is a discrete processor of on time control. The current source 118 producing $I=v(t)/R_D$, capacitor 120 being of capacitance $C_D$, and transistor 124 and resistors 128 and 130, together form the integrator to compute the pulse strength of the virtual pulse in the off period, i.e. $f'_2(t)$. The full strength, $V_f$, enters on line 148 and goes to the voltage divider composed of resistor 116 having a resistance $R_2$ and resistor 122 having a resistance $R_1$. The output of the voltage divider on line 144 goes to the negative input of unit gain differential amplifier 114, which, with its positive input tied to line 146 to receive the output of the integrator, namely $f'_2(t)$. This unit gain amplifier 114 computes the inverse pulse strength of the current pulse to be issued, namely $=(V_f-f'_2(t))$. The output of the differential amplifier 114 on line 142 goes to the negative input of voltage comparator 112, which compares it with the other input on line 38 which receives the output of the linear amplifier. The voltage comparator therefore compares the inverse overall feedback signal to the inverse pulse strength. On the crossing of equality of its inputs, comparator 112 transits as its output on line 150 from high to low to signal the end of the current cycle and the start of a new one. The said transition on line 150 is able, due to the low state on line 162, to pass through OR-GATE 126 onto line 152 to trigger monostable multivibrator 132. On being triggered, monostable multivibrator 132 generates a narrow positive going pulse on line 154 to set flip flop 136, whose outputs Q on line 158 and $\overline{Q}$ on line 160, both active high, provide on state and off state signals to the driver state to control switching the power on and off. On state signal Q on line 158 drives transistor 124 into conduction by means of resistor 128 to discharge capacitor 120 thereby getting the integrator ready for the new cycle. The pulse on line 154, due to the low state on line 156, passes OR-GATE 138 as beginning of cycle signal $T_1$ to the feedback processor. On due time clock generator 140 produces a narrow positive going pulse on line 162 to go to the feedback processor as signal $T_0$ and also to reset flip flop 136 on its trailing edge. The aforedescribed events then repeat themselves.

In case of low side saturation indicated by the high or active state of off state signal on line 160, clock pulse $T_0$ on line 162 is able, due to the high state on line 160, to pass through AND-GATE 134 onto line 156 and then goes through OR-GATE as signal $T_1$ to the feedback processor. It also passes resistor 130 to discharge capacitor 120 by driving transistor 124 into conduction. In case of high side saturation indicated by the low state on line 150, the clock pulse on line 162 is able to pass through OR-GATE 126 onto line 152 to trigger monostable multivibrator 132. On being triggered, monostable multivibrator 132 produces a narrow positive going pulse which sets flip flop 136 to override the reset by the clock pulse on line 162. Due to the setting of flip flop 136, the on state signal on line 158 becomes active or high and thus it discharges capacitor 120 by driving transistor 124 into conduction via resistor 128. Then, the pulse on line 154, due to the low state on line 156, passes OR-GATE as signal $T_1$ to the feedback processor. Thus the proper events missing in case of saturation are made up by the clock pulse on line 162. The racing problem at the low side saturation is solved similarly to the one described hereinbefore.

In practical applications, $V_f$ is proportional to the peak line voltage and hence is easy to obtain. For proper operation the following conditions have to be satisfied:

$R_1/(R_1+R_2)=T/(C_D R_D)$, $R_1/(R_1+R_2)V_f=V^+$, from which $R_1$, $R_2$, $C_D$ and $R_D$ can be selected.

DESCRIPTION OF THE FEEDBACK PROCESSOR

The feedback processor has three inputs: the output of the regulator u, clock pulse $T_0$, and control pulse $T_1$. The feedback processor produces at its output feedback signal either $u_a$ or $u_a+k'/k(d/dt)u_a$, depending on whether damping factor feedback is also used or not. The output of the feedback processor goes to the linear amplifier which provides the overall feedback signal, either $k(u_r-u_a)$ or $k(u_r-u_a)-k'(d/dt)u_a$. A feedback processor has four possible arrangements, depending on the feedback configuration, namely the processor can have voltage feedback only or voltage and damping factor feedback, and with regard to the sampling methods used, it can use the sample and hold method or the direct method. In the direct method it uses u for $u_a$ according to the equations (6c) and (6b). The feedback processor having only voltage feedback and using the direct method is the simplest, since it is only a connection directly from its input u and its output without doing anything else.

Figure 9:
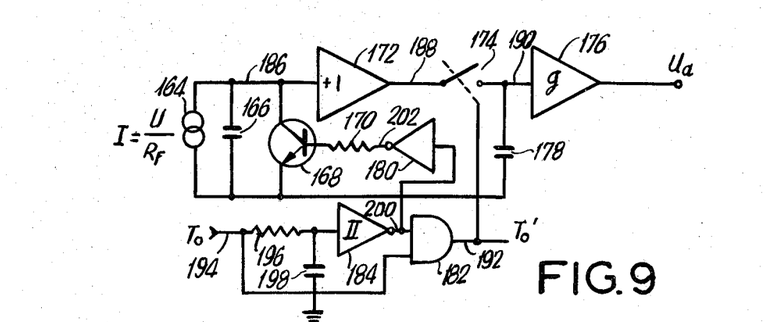
FIG. 9 is an embodiment of a sample and hold circuit for use with a current source as part of a feedback processor in accordance with the present invention.

The feedback processor having voltage feedback only using sample and hold method is shown in FIG. 9. The convenient sampling point is at the clock pulse, $T_0$. The current source 164 producing $I=u/R_F$, capacitor 166 having a capacitance $C_F$ and transistor 168 with resistor 170 together form the integrator to compute $u_a$ from u, according to equation (4b). Voltage follower 172 has its input tied to line 186 which is the output of the integrator and is used to buffer the integrator from loading effects. Clock pulse $T_0$ enters on line 194 and then goes directly to one of the inputs of AND-GATE 182, and to the other input on line 200 via the delay network composed of resistor 196, capacitor 198, and Schmitt trigger 184. In steady state, AND-GATE 182 is in the low state because line 200 and line 194 are always in states opposite each other and it transits to the high state at the rising edge of $T_0$ and stays high until the elapse of the delay determined by the delay network because line 200 is high and will remain high until capacitor 198 is charged through resistor 196 to the high level threshold of Schmitt trigger 184. At that time it brings its output on line 200 to a low state. The output of AND-GATE 182 on line 192 will be used as clock pulse $T_0'$ in computing $(d/dt)u_a$ by a sample and hold method, to be described hereinafter, and it is also used here to activate switch 174 to connect the output of voltage follower 172 on line 188 to line 190 and thereby to capacitor 178 and to the input of linear amplifier 176 with gain g. When the delay elapses and line 192 goes low, switch 174 is deactivated and capacitor 178 will hold the sampled datum $u_a$ for amplifier 176 for the coming cycle. The output of amplifier 176, namely $u_a$, becomes the output of the feedback processor. Furthermore, after the data on line 186 has been sampled and held, clock pulse $T_0$ on line 194 then passes through the delay network onto line 200 and then through inverter 180 onto line 202 and thereby drives transistor 168 through resistor 170 to discharge capacitor 166 to complete the sampling cycle and to get the system ready for the new one. The process thus repeats itself.

For the output, u, of the regulator to lock to $u_r$, $C_F R_F$ and g satisfy the following relation:

$T=C_F R_F g$.

To design a feedback processor of voltage and damping factor feedback, we have to find a circuit to compute $(d/dt)u_a$. The analogue differentiator is not applicable here because we do not have $u_a$ in continuous representation and because if u is used for $u_a$, the analogue differentiator is sensitive to high frequency noise and interference whereby the derivative of the ripple becomes dominant and renders the result useless. The only possible approach will be the discrete method. The conventional digital method cannot be used here either because it needs future data as well as the current and the past data for computation, a process unsuitable for real time application. Other discrete methods must be found. If we consider signal s(t) just a mathematical function, then there are numerous approximate methods available to compute its derivative. If the method is linear, it can be easily carried out by a digital or analogue computer.

We can approximate the signal in any time interval by a polynomial in t, say, of the order n (or equivalently by an n order series of any base):

$$s(t) = a_0 + a_1 t + a_2 t^2 + \ldots + a_n t^n.$$

This is an excellent approximation if the signal s(t) has negligible derivatives of the order higher than n. In other words s(t) is close to a bandlimited signal. The coefficients $a_i$'s can be determined by n+1 sampled data in the said time interval. In fact they are linear functions of these sampled date, i.e. the method is linear and applicable here. The first derivative evaluated at the last sampled point, $t_n$, can be easily calculated and depends on the current and the past data, namely, $$(d/dt)s(t_n) = A_0 D_0 + A_1 D_1 + \ldots + A_n D_n,$$

where $A_i$'s are constants and $D_i$'s are the sampled data at sampled points $t_i$'s. Therefore using an n-stage analogue shift register, we can easily calculate the derivative and hence $u_a + k'/k(d/dt)u_a$.

Figure 10:
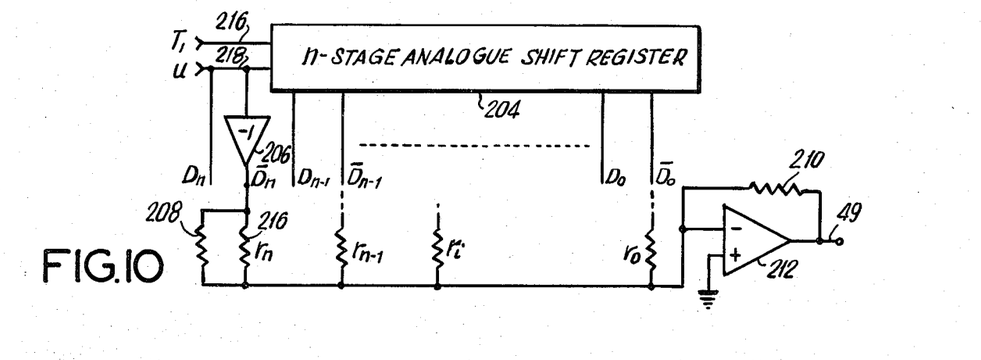
FIG. 10 is an embodiment of a feedback processor which produces voltage and damping factor feedback.

The design shown in FIG. 10 is a feedback processor of voltage and damping factor feedback and using the direct method. N-stage analogue shift register 204 provides sampled data $D_i$ as well as its inverse $\overline{D}_i = -D_i$; on each pulse of $T_1$ entering on line 216, it shifts the data one position to the right and samples and holds on its left most position the new data entering on line 218. The current data $D_n$ on line 218 and the inverse on line 214 produced by inverter 206 are available outside shift register 204. Operational amplifier 212 with resistors 208 and 210 both having the same resistance R and a plurality of parallel resistors 216 having resistance $r_i$, i=0, 1, 2, ... n, sums up its input and produces the sum at its output on line 49 as the following:

$$V_0 = -(R/R\,\overline{D}_n + R/r_n \overline{D}_n + R/r_{n-1}\overline{D}_{n-1} + \ldots + R/r_0 D_0)$$
$$= D_n + R/r_n D_n + \ldots\ldots + R/r_0 D_0,$$

where $D_i$'s are the sampled data of $u_a$ at sampling points $t_i$'s. If $R/r_i = k'/k |A_i|$ and we use $D_i$ instead of $\overline{D}_i$ when $A_i < 0$, then the output of operational amplifier 212 on line 49 is indeed $u_a + k'/k(d/dt)u_a$, the output of the feedback processor.

Figure 11:
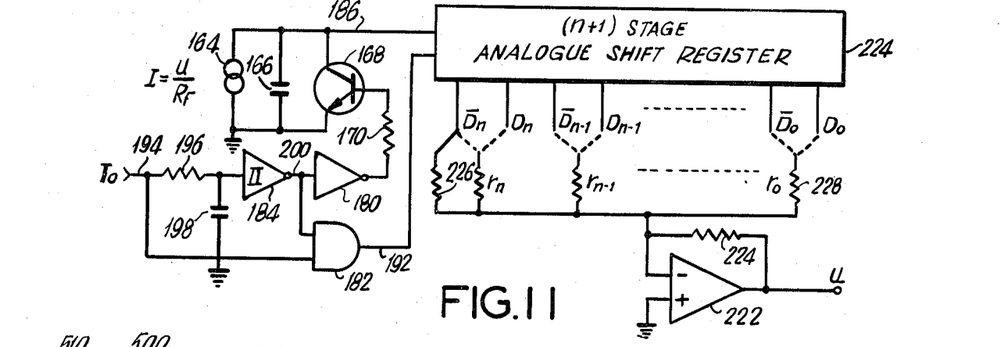
FIG. 11 is another embodiment of a feedback processor combining the use of the sample and hold circuit with damping factor feedback.

If sample and hold method is used, instead of u and $T_1$, we use $u_a$ and $T_0'$ in their places and the result will be a feedback processor using the sample and hold method. On the other hand the sample and hold function performed by the circuit shown in FIG. 9 can be incorporated into an (n+1)-stage analogue shift register as shown in FIG. 11. Here the integrator is formed by the current source 164 producing a current $I = u/R_F$, capacitor 166 having a capacitance $C_F$, and transistor 168 with resistor 170. The integrator produces on line 186 the value $u_a$ from u, as described hereinbefore. Its output on line 186 goes to the (n+1)-stage analogue shift register 224 to sample and to hold (n+1) sampled data for the computation of $u_a + k'/k(d/dt)u_a$. The clock pulse, $T_0$, enters on line 194 and goes directly to one of the inputs of AND-GATE 182 and to the other input, on line 200, via a delay network composed of resistor 196, capacitor 198, and Schmitt trigger 184 to produce pulse $T_0'$, as described hereinbefore. Pulse $T_0'$ on line 192 goes to the shift register 224 to control the sample and shift operation. The outputs of the shift register are data $D_n, \overline{D}_n, \ldots, D_0, \overline{D}_0$, from which operational amplifier 222 with resistors 226 and 224 both of the same resistance R and a plurality of resistors 228 of resistance $r_i$, i=0, 1, 2, ... n, sums up its inputs to produce $u_a + k'/k(d/dt)u_a$, as described hereinbefore. Pulse $T_0$, passing through the delay network and inverter 180, discharges capacitor 166 by driving transistor 168 into conduction via resistor 170, as described hereinbefore.

To design the feedback processor with damping factor feedback, we can use the relation that $(d/dt)u_a$ is proportional to $I_{ind.} - I_{load}$ and the latter can be measured by a Hall effect current probe. However, it is very difficult to separate $I_{ind.}$ from the ripple current in the inductor. Of course we can use the direct method, i.e. using the total inductor current for $I_{ind.}$, but it produces a shift in regulation similar to the substitution of $u_r$ by $u_r \delta(T)$ when using u for $u_a$ and consequently it affects significantly the regulation performance of the system, because ripple current, unlike ripple voltage, is sizable.

Figures 12, 13:
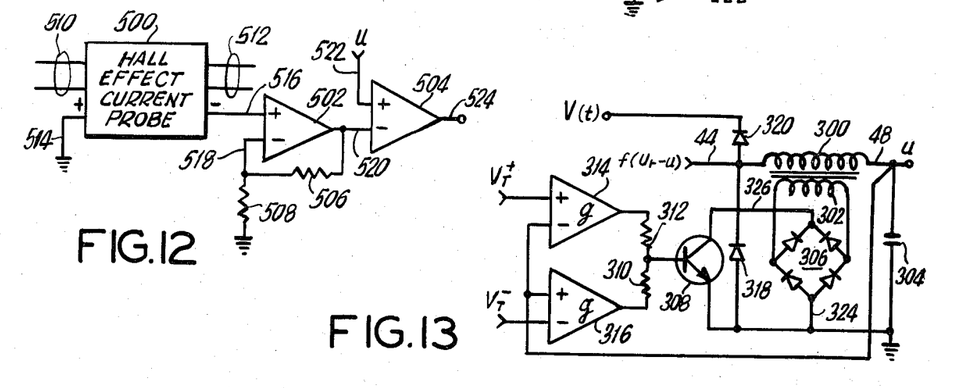
FIG. 12 is an alternate embodiment for a feedback processor directly measuring the inductor and load currents.
FIG. 13 is an embodiment of a low pass filter using a transformer action for speeding up large transition.

The design shown in FIG. 12 is a feedback processor of voltage and damping factor feedback and using the direct method to measure $u_a$ and $I_{ind.}$. Conductor pair entering on line 510 and leaving on line 512 carry total inductor current, namely, $I_{ind.}$ plus ripple current, in the positive direction and load current $I_{load}$ in the negative direction through Hall effect current probe 500, which then produces between the positive terminal on line 514 and the negative terminal on line 516 a signal proportional to the difference of the two input currents. The positive terminal on line 514 is grounded while the negative terminal on line 516 carries the inverse signal to the positive input of operational amplifier 502, which amplifies the inverse signal without inversion and produces it at the output on line 520. The output on line 520 is fedback to the negative input of operation amplifier 502 on line 518 via voltage divider composed of resistors 506 and 508 for adjusting the gain of the amplifier system to obtain the proper damping factor k'. The output on line 520 also goes to the negative input of unit gain differential amplifier 504, which with its positive input tied to u, the output of the regulator, produces at its output on line 524 the difference of the two inputs, namely $u_a - (-R(I_{ind.} - I_{load})) = u_a + k'/k(d/dt)u_a$, the output of the feedback processor.

If the sample and hold method is used, all we need to do is to use the output on line 524 to control current source 164 in the design shown in FIG. 9 to produce a current source of $(u + R(I_{ind.} - I_{load}))/R_F$. Then the output of amplifier 176 of the said design is the proper output of the feedback processor of voltage and damping factor feedback and using sample and hold method.

DESCRIPTION OF THE LOW PASS FILTER

The series inductance in the low pass filter is the limiting factor to the transition response of a switching regulator. The role the inductance plays is to restrict the change of the current passing through it. For a switching regulator the positive effect of this is that it reduces the ripple current and, with the help from the output capacitor, insures a good DC current to the load. The negative effect of this is that it also restricts the change of the inductor current so that the inductor current cannot easily keep pace with the load current in a transition, which causes a serious disturbance at the output and prolongs the transition time. For example, in a transition from the no load to full load current of $I_0$, the inductor DC current starts at zero and has to increase linearly to $2I_0$ over a period of time to provide the load of an average current of $I_0$ over that period of time to meet the load demand. Due to the uneven current supply to the output over that period of time, the output drops significantly so that the output capacitor discharges to provide extra current so that it makes up the temporary shortage in current supply to the load. Furthermore, at the end of that period of time, the inductor DC current is now $2I_0$ and there exists a large excessive inductor current of $I_0$ for the system to damp out, which causes further disturbance at the output and prolongs the transition.

Therefore, there is a need to reduce the transition time, particularly for application of the linear switching regulator to AC regulation. The problem here is that the system is driven most of the time into saturation, in which normal action of linear operation and damping is not valid. Accordingly, to reduce the transition time, we have to actually reduce the duration of saturation. The basic approach is to provide an auxiliary path to supply current to the output during saturation so that upon recovering from saturation the inductor current is about matched to the load current. Consequently, the transition will end shortly after recovering from saturation.

The design in FIG. 13 is a low pass filter system with an auxiliary path provided by the auxiliary wiring 302 to inductor 300, which now looks like a transformer. Inductor 300 and capacitor 304 form the basic LC low pass filter with its input tied to line 44, which carries the pulse train from the output stage, and the output to line 48, the output of the regulator. Commutating diode 320 with its anode tied to line 44 and its cathode, to the power source, i.e., the line, and commutating diode 318 with its cathode tied to line 44 and its anode connected to the ground are used to discharge the energy stored in inductor 300 to the source via diode 320 and to the output via diode 318. Auxiliary winding 302 goes to the AC terminals of the full wave bridge rectifier 306, whose negative output on line 324 is grounded and whose positive output on line 326 goes to the collector of transistor 308 serving as a load to auxiliary wiring 302. Amplifier 314 of gain g and with its negative input tied to line 48, the output of the regulator, and its positive input, to the threshold $V_T{}^+$ of high side saturation, is used to detect high side saturation and to drive through resistor 312 having resistance $r_1$ the transistor 308 during high side saturation, while amplifier 316 of gain g and with its positive input tied to line 48 and its negative input to the threshold $V_T{}^-$ of low side saturation, is used to detect low side saturation and to drive through resistor 310 having resistance $r_2$ the transistor 308 during low side saturation. When, during a transition, the system is driven into saturation, say high side saturation, amplifier 314 amplifies the level of saturation and drives transistor 308 to conduct certain amount of current dependent on the level of saturation, gain g, and resistance $r_1$. The current flowing through the auxiliary winding 302 is equivalent to, according to transformer theory, a current passing through the reflected impendence (the auxiliary path) across the primary wiring, namely the inductor itself. The parameters $r_1$, $r_2$, $V_T{}^+$, $V_T{}^-$, and g are so chosen that upon recovering from saturation the inductor current is about equal to the load current. Therefore the transition will end shortly thereafter. This approach cuts transition time more than a half and is very effective, but it is resistive and therefore dissipates some energy when active. As a result it lowers the efficiency of the system somewhat if large transition occurs very frequently.

Figure 14:
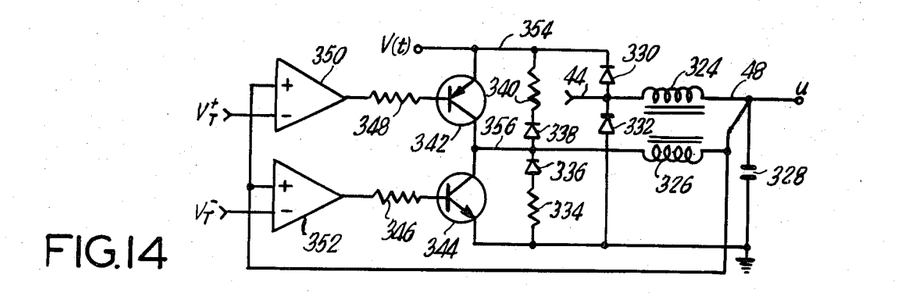
FIG. 14 is an alternate embodiment of the low pass filter using a parallel inductor for speeding up large transition.

The design in FIG. 14 uses an auxiliary inductor 326 for the auxiliary path. Here main inductor 324 is designed to carry small ripple current and hence has a large inductance and slow response if used alone. Main inductor 324 and capacitor 325 form the basic LC low pass filter with its input tied to line 44 providing the pulse train from the output stage, and the output, to line 48 which is the output of the regulator. Commutating diode 330 with its anode tied to line 44 and its cathode, to the power source on line 354, and diode 332 with its cathode tied to line 44 and its anode to the ground are used to discharge the energy stored in inductor 324 to the power source via diode 330 and to the output via diode 332. Auxiliary inductor 326 has about the same inductance as the main inductor has, but is much smaller in size because its duty is not for filtering and blocking ripple current and thus flux saturation is not a problem. One end of inductor 326 is tied to line 48 and the other to the collectors of transistors 342 and 344. Commutating diodes 338 and 336 are used to discharge energy stored in inductor 326 to the power source or to the output, as described hereinbefore, while resistors 340 and 334 respectively in series with diodes 338 and 336 are for damping. This provides a way of trading efficiency for speed. Operational amplifier 350 with its positive input tied to line 48 and its negative input, to the threshold, $V_T{}^+$, of high side saturation, is used to detect high side saturation and to switch transistor 342 on by driving it through resistor 348 into conduction during high side saturation. Similarly, transistor 352 with its positive input tied to line 32 and its negative input, to the threshold, $V_T{}^-$ of low side saturation, is used to detect low side saturation and to switch on transistior 352 by driving it through resistor 346 into conduction during low side saturation. Therefore during saturation, both inductors 324 and 326 are active in parallel and the system has an effective inductance half the inductance which the main inductor has. Consequently the transition time is cut, depending on resistors 340 and 336, more than half the transition time if the main inductor is used alone.

DESCRIPTION OF A FREE RUNNING LINEAR SWITCHING REGULATOR

Figure 15:
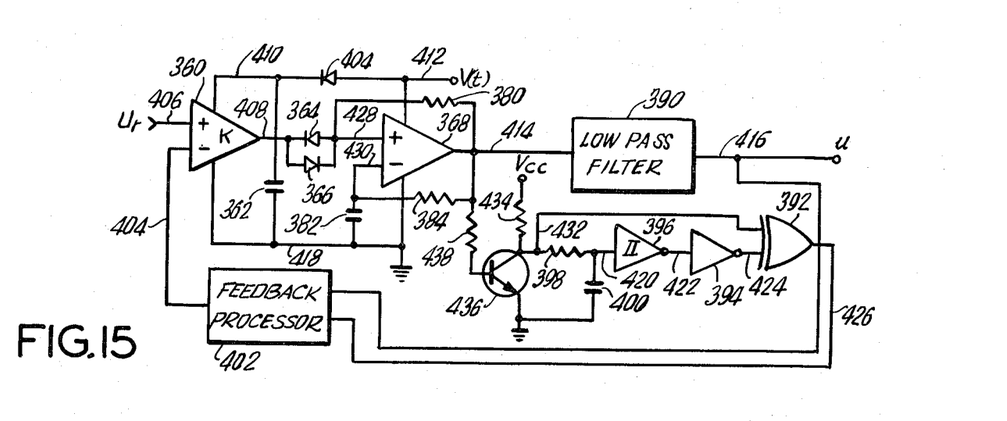
FIG. 15 is another embodiment of a discrete processor utilizing a free running oscillator wherein both the on and off times vary in each cycle.

The statistical interpretation of the operation of a switching regulator or a switching amplifier offers a simple way to implement equation (4a) or (5a). Statistically these equations state that the short term average of the output of the switching amplifier over one cycle should be proportional to its input, which, for a linear switching regulator, is just the long term average of its output The design shown in FIG. 15 is a free running switching regulator meeting this statistical requirement. Power operational amplifier 368 with associated feedback components forms a free running oscillator, or, more precisely, a free running switching voltage follower. The power source, in this case the line V(t) enters at 412 and then goes to the positive power terminal of amplifier 368, while its negative power terminal is tied to the ground line, 418. The output of amplifier 368 on line 414 goes to its positive input on line 428 via resistor 380 to form the positive feedback, and also goes, via resistor 384, to the negative input on line 430 and to capacitor 382 to form the negative RC feedback. These two feedbacks cause amplifier 368 to oscillate at a frequency depending on capacitor 382 and resistor 384 and also on the voltage on line 408, which servies as the input to the switching voltage follower just described. When the output of amplifier 368 on line 414 is high, it charges capacitor 382 via resistor 384 to one diode drop above line 408, and then the negative input on line 430 becomes higher than the positive input on line 428, which is held to one diode drop above line 408 since the current flows from line 412 via resistor 380 to forward bias diode 364 to keep line 428 one diode drop above line 408. Due to regeneration, the output of amplifier 368 on line 414 quickly goes to the low state and this causes current flowing back to line 414 via line 408, diode 366, and resistor 380. Now diode 366 is forward biased and thus it keeps line 428 one diode drop below line 408. Furthermore, capacitor 382 is now discharged by resistor 384 to the output of amplifier 368 on line 414. Once it is discharged to one diode drop below line 408, it causes the negative input on line 430 to be lower than the positive input on line 428. The output of amplifier 368 on line 412 therefore goes high and the cycle repeats itself.

From the other view, resistor 384 and capacitor 382 form an RC low pass filter to measure the average of the output on line 414. Since its output on line 430 is one diode drop above and one diode drop below line 408, therefore, the average over one cycle is exactly the voltage on line 408 which is the input of the switching voltage follower.

Linear amplifier 360 of gain k provides gain to the system and the power source on line 412 goes through decoupling diode 404 onto line 410 and capacitor 362 to supply to amplifier 360. If the power source on line 412 does not vary widely, the decoupling network composed of diode 404 and capacitor 362 may be omitted. Linear amplifier 360 with its positive input tied to $u_r$ and its negative input connected to the output of feedback processor 402, produces at its output on line 408 the over all feedback signal $k(u_r-u_a)$ or $k(u_r-u_a)-k'(d/dt)u_a$, depending on the method used in the feedback processor.

With low pass filter 390 attached to line 414 to produce 416 the output of the system, the system becomes a linear switching regulator since the requirement of equations (4a) or (5a) and (4b) is met. An important feature of this free running system is that the system runs on its own non-uniform clock, i.e. the discrete process is carried out in a nonuniformly sampling method. Because of this it is very difficult to use sample and hold method in the feedback processor, because the latter performs best with a uniform clock.

The other unusual feature of this design is that there are two control points in each cycle, i.e. both the on-time and the off-time are controlled, and thus it offers the fast response at the same operating frequency. If damping factor feedback is used, we have to provide signal $T_1$ to the feedback processor at both control points. Signal $T_1$ can easily be generated from the output on line 414. The signal on line 414 is inverted to line 432 by level translator composed of resistor 438, transistor 436, and pullup resistor 434. Hence the inverted signal goes to one of the inputs of exclusive OR-GATE 392 and also, via the delay network composed of resistor 398, capacitor 400, and Schmitt trigger 396, to line 422. It is inverted by the Schmitt trigger 396 on its way, then passes through inverter 394 onto line 424 and is again inverted by it. Finally, being delayed and inverted twice from its start at line 432, it arrives at the other input of exclusive OR-GATE 392 as a signal of the same state as the signal on line 423. Therefore, the output of exclusive OR-GATE is normally low, but goes high on the transition of line 432, a consequence of the transition on line 414, and stays high until the delay determined by the delay network elapses, because line 424 and line 432 are not in the same state before the delay has passed. As a result we have a pulse on each transition on line 414, i.e. each switching time. This pulse as signal $T_1$ on line 426 goes to feedback processor 402 for control purpose, while the output of the regulator on line 416 also goes to feedback processor 402 to generate the feedback signal on line 404 to linear amplifier 360 to complete the signal path.

As an amplifier, this design is simple, effective, and efficient, but its unorthodox nonuniformly sampling method makes it difficult to evaluate its frequency response. It is therefore useful where high fidelity is not required or the output level is low.

As a linear switching regulator this sytem offers excellent stability at no load, good transition not only from no load to full load but also from full load to no load. This is because it can take energy stored in the low pass filter back to the line a feature few switching regulators possesses. Plus its simplicity in design, it is an ideal switching regulator for DC to DC application, such as in an uninterrupted power supply.

There has been disclosed heretofore the best embodiments of the invention presently contemplated. However, it is to be understood that various changes and modifications may be made thereto without departing from the spirit of the invention.

What I claim is:

1. A linear switching voltage regulator for regulating line voltage comprising:
   a linear amplifier receiving a reference signal and an output feedback signal and producing an overall feedback signal;
   discrete processor means for receiving said overall feedback signal as well as a high frequency feedback from its own output switching signal and for producing as its output switching signal a pulse strength modulation signal;
   output means for turning on and off the line voltage by means of said switching signal to produce an intermediate output signal, and
   filter means filtering said intermediate output signal to produce a voltage regulated output signal, said output feedback signal being derived from said voltage regulated output signal.

2. A voltage regulator as in claim 1 and further comprising feedback means receiving said voltage regulated output signal and producing said output feedback signal.

3. A voltage regulator as in claim 2, wherein said feedback means comprises means coupled to the flow of both the inductor current and the load current for balancing the inductor current of the regulator with the load current of the output.

4. A voltage regulator as in claim 2, wherein said feedback means comprises means for producing damping factor feedback by providing for the derivative of the voltage regulated output signal.

5. A voltage regulator as in claim 1, wherein said discrete processor means comprises means for producing for each switching cycle a pulse strength signal proportional to the type of output and also that would be produced by a linear regulator receiving the same reference and feedback signals.

6. A voltage regulator as in claim 5, wherein said discrete processor means comprises integrator means for providing the integral of the switching signal for each cycle.

7. A voltage regulator as in claim 6, wherein said discrete processor means comprises a clock circuit means and a control circuit means, one of said circuit means controlling the switching on of the line voltage in each cycle and the other circuit means controlling the switching off of the line voltage in each cycle.

8. A voltage regulator as in claim 6, wherein said integration means comprises a current source producing a current proportional to said switching signal, a capacitor charged by said current source, and a switching transistor coupled to said capacitor for periodically discharging it.

9. A voltage regulator as in claim 8, and further comprising comparator means receiving the output from said integration means and the output from said linear amplifier, and producing control output signal upon their equality, a clock means periodically producing a clock signal switching circuit means responsive to said control output signal for producing an off-state signal and responsive to said clock signals for producing an on-state signal, said on and off state signals being applied to said output means, said off-state signal and said clock signal also being applied to said switching transistor whereby said capacitor charges following said clock signal and discharges following said off-state signal.

10. A voltage regulator as in claim 9, and further comprising coupling means for connecting said clock means to said switching amplifier for discharging said capacitor should said off-state signal fail to operate, and additional coupling means for connecting said clock means in parallel with said control output signal for producing said off-state signal should said control output signal fail to occur.

11. A voltage regulator as in claim 8, and further comprising a differential amplifier receiving a full strength signal of the pulse for an entire switching cycle and the output from said integration means, said integration means output representing the pulse strength of the virtual pulse in the off period, said differential amplifier producing an output representing the pulse strength of the pulse to be issued, comparator means for receiving the output from said differential amplifier and the output from said linear amplifier and producing a control output signal upon their equality, clock means periodically producing a clock signal, switching circuit means responsive to said clock signal for producing an off-state signal and responsive to said control output means for producing an on-state signal, said on and off-state signals being applied to said driver circuit, said off-state signal and said clock signal also being applied to said switching transistor, whereby said capacitor charges following said clock signal and discharges following said on-state signal.

12. A voltage regulator as in claim 11, and further comprising coupling means for connecting said clock means to said switching transistor for discharging said capacitor should said on-state signal fail to operate, and additional coupling means for connecting said clock means in parallel with said control ouput signal for producing said on-state signal should said control output signal fail to occur.

13. A voltage regulator as in claim 3, wherein said feedback means comprises means for ingetrating the voltage regulated output signal to produce an output corresponding to that produced by an equivalent linear regulator, and sample and hold means for sampling said output from said integrating means and holding it for a given time.

14. A voltage regulator as in claim 4, wherein said feedback means comprises an n-state analogue shift register receiving sampled values of the voltage regulated output signal at clocked intervals and with the new sample values continuously appearing in the shift register at the end locations while the previous data is shifted along, said new sampled values also being available externally of the shift register, a sequence of resistor means respectively coupled to each shift position of the shift register, and summing means for adding all of the sampled values from the shift register, as well as the externally available value, proportionally to their respective resistors to thereby form a damping factor feedback.

15. A voltage regulator as in claim 13, wherein said feedback means further comprises an n+1 stage analogue shift register receiving the sampled values from the sample and hold circuit at intervals as clocked by the sample and hold circuit, a sequence of resistor means respectively coupled to each shift position of the shift register, and summing means for adding all of the sampled values from the shift register proportionately to their respective resistors to thereby form a damping factor feedback.

16. A voltage regulator as in claim 3, wherein said feedback means comprises a Hall effect current probe receiving as inputs the total inductor current in a first direction and the load current in an opposite direction, and producing a difference signal proportional to the difference between the two input currents, an operational amplifier receiving the difference signal and providing a proper damping factor to it, and a differential amplifier receiving as one input the voltage regulated output signal and as another input the output from the operational amplifier to thereby produce said damping factor feedback.

17. A voltage regulator as in claim 16, and further comprising a constant current source controlled by the output from said differntial amplifier, and a sample and hold circuit for sampling the output from said current source and holding it for a given time interval.

18. A voltage regulator as in claim 1, wherein said filter means comprises an inductor in series with the voltage regulated output, a capacitor in parallel across the output, and an auxiliary inductor path in parallel with said inductor to supply current to the output during saturation of the system such that upon recovering from saturation the inductor current is approximately matched to the load current.

19. A voltage regulator as in claim 18, and further comprising a first commutating diode coupled between the input of the inductor and the line voltage, and a second commutating diode coupled between the input of the inductor and the ground, for thereby providing discharge paths for the energy stored in the inductor.

20. A voltage regulator as in claim 18, wherein said auxiliary inductance path comprises an auxiliary inductor inductively coupled through transformer action to said inductor, a rectifier having its input connected across the auxiliary winding, a load transistor coupled across the output of said rectifier, a pair of amplifiers whose outputs are individually connected to operate said load transistor and whose inputs are respectively connected to a voltage corresponding to the high side saturation and to a voltage corresponding to the low side saturation of the system, whereby when the system is driven into saturation during a transition, one of said amplifiers drives the load transistor to conduct an amount dependent upon the level of saturation, whereby a corresponding current will flow in said auxiliary winding.

21. A voltage regulator as in claim 18, wherein said auxiliary inductor has one end coupled to the output, first and second transistors interconnected together and placed across the output with their interconnection coupled to the other end of the auxiliary inductor, and a pair of amplifiers whose outputs are connected to operate a respective one of said transistors, and whose inputs are respectively connected to a voltage corresponding to the high side saturation and to a voltage corresponding to the low side saturation, whereby when the system is driven into saturation one of said amplifiers drives its corresponding transistor to cause a current to flow in said auxiliary inductor.

22. A voltage regulator as in claim 21, and further comprising a pair of commutating diodes respectively connecting said other end of the auxiliary winding between the line voltage and the output for thereby providing discharge paths to said auxiliary winding.

23. A voltage regulator as in claim 1, wherein said discrete processor comprises a free running oscillator whose first input receives said overall feedback signal and a feedback from its own output, a frequency determining circuit interconnected between the oscillator output and its second input for oscillating the second input above and below the first input, and wherein said line voltage is coupled to the power input of said oscillator and is controlled by the oscillating output of the oscillator.

24. A voltage regulator as in claim 23, wherein two opposing diode means are coupled in parallel to each other and are connected between the output of the linear amplifier and said first inputs of said free rnning oscillator.

25. A low pass filter for filtering an input signal to produce an output signal, comprising: an inductor in series with the filter output and a capacitor in parallel across the filter output, and an auxiliary inductance path means in parallel with said inductor for supplying current to the filter output during saturation of the system and for speeding up transitions during load changes, such that upon recovering from saturation the inductor current is approximately matched to the load current of the filter output, said auxiliary inductance path means including an auxiliary winding inductively coupled through transformer action to said inductor, a rectifier having its input connected across the auxiliary winding, a load transistor coupled across the output of said rectifier, a pair of amplifiers whose outputs are individually connected to operate said load transistor and whose inputs are respectively connected to a voltage corresponding to the low side saturation of the system, whereby when the system is driven into saturation during a transition, one of said amplifiers drives the load transistor to conduct an amount dependent upon the level of saturation, whereby a corresponding current will flow in said auxiliary winding.

26. A low pass filter for filtering an input signal to produce an output signal, comprising: an inductor in series with the filter output and a capacitor in parallel across the filter output, and an auxiliary inductance path means in parallel with said inductor for supplying current to the filter output during saturation of the system and for speeding up transitions during load changes, such that upon recovering from saturation the inductor current is approximately matched to the load current of the filter output, said auxiliary inductance path means including an auxiliary winding having one end coupled to the filter output, first and second transistors interconnected together and placed across the filter output with their interconnection coupled to the other end of the auxiliary winding, and a pair of amplifiers whose outputs are connected to operate a respective one of said transistors, and whose inputs are respectively connected to a voltage corresponding to the high side saturation and to a voltage corresponding to the low side saturation, whereby when the system is driven into saturation one of said amplifiers drives its corresponding transistor to cause a current to flow in said auxiliary winding dependent upon the level of saturation.

27. A low pass filter as in claim 26, and further comprising a pair of commutating diodes respectively connecting said other end of the auxiliary winding between the line voltage and the ground, for thereby providing discharge paths to said auxiliary winding.

28. A low pass filter as in claim 26, and further comprising a first commutating diode coupled between the inductor and the filter input, and a second commutating diode coupled between the inductor and ground, for thereby providing discharge paths for the energy stored in the inductor.

* * * * *